United States Patent
Bergeron et al.

(10) Patent No.: US 7,481,308 B2
(45) Date of Patent: Jan. 27, 2009

(54) LOCKABLE REMOVABLE CASSETTE

(75) Inventors: Alfred F. Bergeron, Chester Springs, PA (US); Robert Clauser, Columbus, NJ (US); Christopher L. Crawford, Pottstown, PA (US); David C. Deaville, West Chester, PA (US); Michael D. Nunn, West Chester, PA (US); Jeffrey T. Thawley, Claymont, DE (US); Kenneth B. Wood, Downingtown, PA (US); Stephen R. Watrous, Moravia, NY (US)

(73) Assignee: Mei, Inc., West Chester, PA (US)

( * ) Notice: Subject to any disclaimer, the term of this patent is extended or adjusted under 35 U.S.C. 154(b) by 0 days.

(21) Appl. No.: 10/853,989

(22) Filed: May 25, 2004

(65) Prior Publication Data

US 2004/0213620 A1 Oct. 28, 2004

Related U.S. Application Data

(60) Continuation of application No. 10/775,873, filed on Feb. 10, 2004, which is a division of application No. 09/982,578, filed on Oct. 16, 2001, now Pat. No. 6,712,352.

(60) Provisional application No. 60/241,197, filed on Oct. 17, 2000.

(51) Int. Cl.
*G07D 7/12* (2006.01)
*G07D 11/00* (2006.01)

(52) U.S. Cl. ........................................ 194/350; 194/352

(58) Field of Classification Search ................ 194/350, 194/206, 344, 352; 271/3.01, 145; 902/8, 902/9
See application file for complete search history.

(56) References Cited

U.S. PATENT DOCUMENTS

| 901,778 A | 10/1908 | Bucknam |
| 1,394,941 A | 10/1921 | Ruebsamen et al. |
| 2,253,270 A | 8/1941 | Golber |
| 2,973,139 A | 2/1961 | Leone et al. |

(Continued)

FOREIGN PATENT DOCUMENTS

JP 52-30302 8/1950

(Continued)

OTHER PUBLICATIONS

Steven M. Chookazian, "The Emabond Process for Thermoplastic Assembly with Specific Emphasis on Polyolefins and TPE's," meeting of the Rubber Division, American Chemical Society, Sep. 29-Oct. 2, 1998, 13 pages.

(Continued)

*Primary Examiner*—Patrick Mackey
*Assistant Examiner*—Mark Beauchaine
(74) *Attorney, Agent, or Firm*—Fish & Richardson P.C

(57) ABSTRACT

A lockable, removable cassette is described. In an implementation, the cassette includes a plastic shell and a currency access door. The cassette may also include a flexible handle and/or an integrated grip. In addition, the cassette may include at least one of an aperture and a transparent window positioned to reveal the contents of the cassette. In an implementation, the cassette includes a stacking mechanism which may include a drive means having non-circular drive gears.

16 Claims, 18 Drawing Sheets

U.S. PATENT DOCUMENTS

| | | | |
|---|---|---|---|
| 3,016,185 A | | 1/1962 | Osborne |
| 3,724,717 A | * | 4/1973 | Goto ........................... 221/155 |
| 3,773,252 A | | 11/1973 | Jensen |
| 3,773,272 A | * | 11/1973 | Wallace ................... 242/326.1 |
| 3,918,371 A | | 11/1975 | Gartner et al. |
| 3,966,116 A | | 6/1976 | Dominick et al. |
| 4,050,562 A | | 9/1977 | Schwippert et al. |
| 4,168,092 A | * | 9/1979 | Nothmann ................. 294/87.1 |
| 4,313,601 A | | 2/1982 | Graef et al. |
| 4,341,100 A | | 7/1982 | Kohlhage |
| 4,434,931 A | | 3/1984 | Hunt et al. |
| 4,447,097 A | * | 5/1984 | Lafevers et al. ............. 312/215 |
| 4,513,439 A | | 4/1985 | Gorgone et al. |
| 4,648,327 A | | 3/1987 | Toth et al. |
| 4,655,391 A | | 4/1987 | Granzow et al. |
| 4,807,736 A | | 2/1989 | Kondo et al. |
| 4,840,368 A | | 6/1989 | Uehara |
| 4,854,247 A | | 8/1989 | Sciortino et al. |
| 4,896,826 A | | 1/1990 | Bernier |
| 4,913,341 A | | 4/1990 | Bachman |
| 4,949,901 A | | 8/1990 | Harris |
| 4,977,583 A | * | 12/1990 | Gorgone ........................ 377/8 |
| 4,997,128 A | | 3/1991 | Suris |
| 4,998,379 A | | 3/1991 | Yamada et al. |
| 5,014,857 A | | 5/1991 | Kondo |
| 5,158,275 A | | 10/1992 | Sellers et al. |
| 5,161,736 A | | 11/1992 | Roccoberton et al. |
| 5,180,232 A | * | 1/1993 | Chadima et al. .............. 400/88 |
| 5,205,481 A | | 4/1993 | Dekker |
| 5,209,335 A | * | 5/1993 | Shuren et al. ................ 194/200 |
| 5,209,395 A | | 5/1993 | Zouzoulas et al. |
| 5,224,579 A | | 7/1993 | Brown |
| 5,251,738 A | | 10/1993 | Dabrowski |
| 5,346,736 A | * | 9/1994 | Mizuno et al. ............. 428/36.9 |
| 5,372,361 A | | 12/1994 | Isobe et al. |
| 5,405,131 A | | 4/1995 | Zouzoulas |
| 5,411,249 A | | 5/1995 | Zouzoulas |
| 5,421,443 A | | 6/1995 | Hatamachi et al. |
| 5,476,353 A | | 12/1995 | Mola |
| 5,564,545 A | | 10/1996 | Suzuki |
| 5,615,625 A | | 4/1997 | Cassidy et al. |
| 5,624,017 A | | 4/1997 | Plesko |
| 5,632,367 A | * | 5/1997 | Bergeron et al. ............. 194/207 |
| 5,653,436 A | | 8/1997 | Zouzoulas |
| 5,662,202 A | | 9/1997 | Suris |
| 5,695,173 A | * | 12/1997 | Ochoa et al. ................. 254/122 |
| 5,730,271 A | | 3/1998 | Buchman et al. |
| 5,758,759 A | * | 6/1998 | Negishi ...................... 194/207 |
| 5,836,510 A | | 11/1998 | Kirchner |
| 5,907,141 A | * | 5/1999 | Deaville et al. ............. 235/375 |
| 5,997,121 A | * | 12/1999 | Altfather et al. ................ 347/7 |
| 6,042,001 A | | 3/2000 | Siler et al. |
| 6,199,856 B1 | | 3/2001 | Clauser et al. |
| 6,209,944 B1 | | 4/2001 | Billiu et al. |
| 6,217,019 B1 | * | 4/2001 | Ishiduka et al. ............. 271/147 |
| 6,244,589 B1 | | 6/2001 | Gerlier |
| 6,246,466 B1 | * | 6/2001 | Hirano et al. ................ 355/407 |
| 6,286,629 B1 | | 9/2001 | Saunders |
| 6,292,579 B1 | | 9/2001 | Hutchinson |
| 6,426,028 B1 | * | 7/2002 | Lerch et al. ................. 264/250 |
| 6,585,260 B1 | | 7/2003 | Izawa et al. |
| D482,056 S | | 11/2003 | Bergeron et al. |
| 6,896,255 B1 | | 5/2005 | Fick |

FOREIGN PATENT DOCUMENTS

| | | |
|---|---|---|
| JP | 63-265747 | 11/1988 |
| JP | 01-269688 | 10/1989 |
| JP | 2-99836 | 8/1990 |
| JP | 03-196288 | 8/1991 |
| JP | 5-79679 | 10/1993 |
| JP | 6-139430 | 5/1994 |
| JP | 6-48066 | 6/1994 |
| JP | 7-29677 | 6/1995 |
| JP | 7-215491 | 8/1995 |
| JP | 7-295381 | 11/1995 |
| JP | 08-123991 | 5/1996 |
| JP | 8-202923 | 8/1996 |
| JP | 61-229185 | 10/1996 |
| JP | 9-135991 | 5/1997 |
| JP | 11-208902 | 8/1999 |
| JP | 11-246061 | 9/1999 |
| WO | WO 01/23290 A1 | 5/2001 |

OTHER PUBLICATIONS

"Searching for the perfect blend," European Plastics News, May 1994, p. 22.

MEI Series 2000, Operation and Service Guide, front page (2004).

MEI ZT Technical Manual, front page (2003).

Japan Cash Machine DBV-45 acceptor, page from www.icausa.net/DBVpb2.html (Nov. 1, 2006).

Court docket sheet for Civil Action No. 05CV-3165 (Mars et al. v. JCM American Corp. et al.), pending in the U.S. District Court for the District Court of New Jersey (Oct. 2006).

Mars Bill Acceptor, Series 1000, User Manual ZT Series 1200, Bill Acceptor, Mars Electronics International, Inc., Part # 251051076, Rev. G1, pp. 1-34 (1999).

Operating Instructions for BNA541 & BNA542, Removable Security Stacking Cash-box, MEI, Release G3, 60105 60750 9 001 G3, pp. 1-4 (Mar. 1998).

Maintenance Manual with Illustrated Spare Parts for Banknote Validator with Stacker and Cashbox, BNA 51/BNA 56/ BNA 54, MEI, Inc., Version G2, 60105 63943 4 004, 22 pages (Dec. 2001).

Maintenance Manual with Illustrated Spare Parts for Stacker and Cashbox, BNA541, Mars Electronics International Incorporated, Geneva Branch, Version G1, 60105 64293 5 044, 44 pages (Dec. 2001).

Sodeco product literature, "100,00 steps to Success . . . ," 2 pages (2001?).

Photographs of a Mars Electronics International BNA 541 unit (4 photos), (No Date).

Photographs of Mars Electronics International BNA 541 unit (4 photos), (No Date).

WBA-12/13-SS, WBA-22/23-SS, WBA-24/25-SS2, Chapter 8, Japan CashMachine Co., Ltd., 19 pages (Issue Jun. 1, 2004).

World Bill Acceptor, WBA-**-SS, Chapters 1-9, Japan CashMachine Co., Ltd., Class 943-11-01-00 (Jun. 1996).

WBA-12/13-SS, WBA-22/23-SS; WBA-24/25-SS2; Illustrated Parts List, Chapter 8, 19 pages, (No Date).

JCM WBA-13, General Information, Atronic, 8 pages (Aug. 1999), no date.

The World's Currency Handling Solution, JCM, 18 pages, (No Date).

Business Results for the First-Half of the Fiscal Year Ending Mar. 31, 2006, Japan CashMachine Co., Ltd., 24 pages (Nov. 2005).

"Japan CashMachine WBA Series Ready for Euro!" http://www.pchange.com/english/enwba.html, page 1 (printed on Jun. 24, 2002).

JCM Technical Bulletin 00311, JCM American Corporation, one page, (No Date).

JCM Technical Bulletin 200502, one page (Feb. 2005).

* cited by examiner

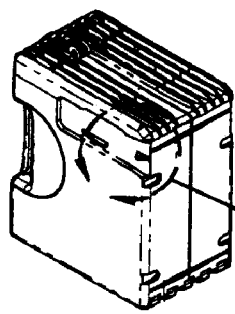
FIG. 8
FIG. 8A
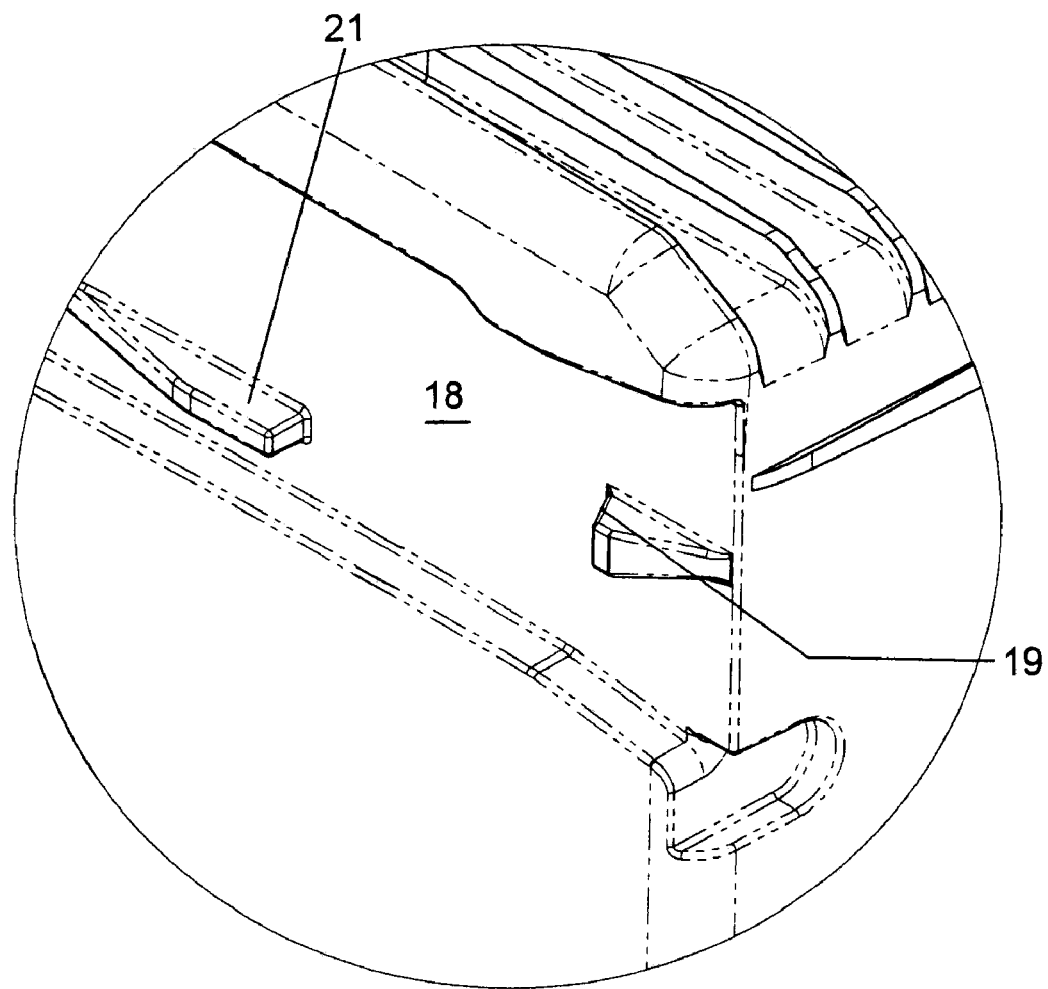
FIG. 8A

LOCKABLE REMOVABLE CASSETTE

This application is a continuation of U.S. patent application Ser. No. 10/775,873 filed on Feb. 10, 2004, which is a divisional of U.S. patent application Ser. No. 09/982,578, filed on Oct. 16, 2001, now U.S. Pat. No. 6,712,352, which claims priority from U.S. Provisional Application No. 60/241,197, filed on Oct. 17, 2000.

BACKGROUND OF THE INVENTION

The invention pertains to an improved method of construction for lockable removable cassettes or cash boxes used for the protection of banknotes in automated handling equipment such as gaming machines, vending machines, automated teller machines and the like.

Current cash box products suffer from several deficiencies, including not being sufficiently rugged for general handling, and being of high cost. Further, it is not possible to distinguish a full cash box from an empty one without opening a currency access door with a key, conventional cash boxes require operation of a latch before removal is possible, and such cash boxes do not give a positive or easily recognizable indication that the cash box has not been properly seated in the host machine.

SUMMARY OF THE INVENTION

The present invention pertains to a lockable, removable cassette which includes improvements described herein that address all of the above defects.

An improved mechanism for stacking bills is also described. The improvements include a means to achieve a large stroke in a compact geometry and a means to adjust the available force on the pusher plate mechanism as a function of the pusher extension. Optimum compactness and efficiency can thereby be achieved.

Other features and advantages of the invention will be apparent from the following detailed description as illustrated by the accompanying drawings. The drawings are not necessarily to scale, emphasis instead being placed upon illustrating the principles of the invention.

BRIEF DESCRIPTION OF THE DRAWINGS

FIG. 8 is a detailed view of cassette showing an installation guide groove and latching ramp. FIG. 8A is a detail view of part of FIG. 8.

Like reference numbers in the various drawings indicate like elements throughout the different views.

DETAILED DESCRIPTION

Figure 1:
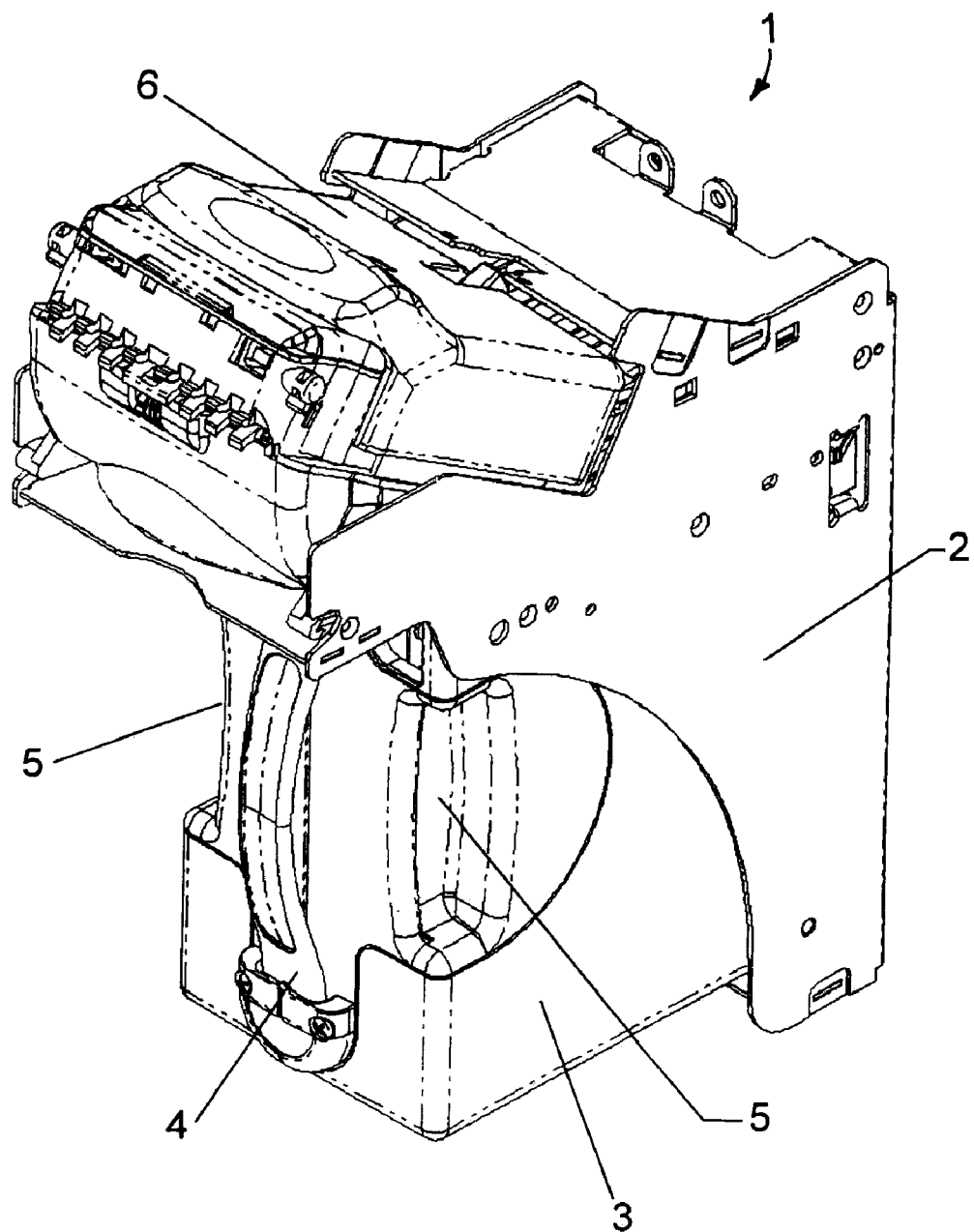
FIG. 1 is an isometric view of a bank note processor with an installed cassette according to the invention.

FIG. 1 shows a banknote processor (1) that includes a chassis (2), a removable secure banknote cassette (3) and a removable banknote validator (6). The chassis (2) is typically securely affixed to a host machine by mounting screws and therefore is usually not removed during normal operation or typical repair. The cassette (3) and validator (6) may be removed from the chassis (2) independently of each other.

During normal operation the removable secure banknote cassette (3) is removed when it is desired by the operator to extract the stored payment media such as banknotes. It should be noted that the terms banknote, bill, paper currency, security document, coupons and the like denote items which may be inserted into the validator, transported and then stored in the cassette.

FIG. 1 shows the front of the removable secure banknote cassette (3) approximately as it is presented to an operator or service personnel. As shown, a flexible cassette handle (4) is presented in a convenient ergonomic location that allows the operators wrist to remain in a vertical plane while removing the cassette. The main part of this handle (4) may be molded from an elastomeric material. This has two important benefits. It provides operator comfort, which is important in an environment where cassettes are handled frequently. It also provides an ability for the handle to deflect, or lie flat against the cassette to avoid collision with cashbox door and any lock assemblies that may be part of the host machine. Previous cash box products have used folding mechanisms to achieve a compact cassette handle, but such mechanisms have been fairly complex and difficult to manufacture resulting in higher costs and reduced ergonomic benefit. Notwithstanding the above accommodations, there may still exist host automatic transaction machines which cannot even accept a cassette with a flexible handle. For such automatic transaction machines having no clearance or little clearance the cassette handle (4) may be removed. The cassette can still be gripped using an integral molded cassette grip (5) fabricated on either side of the body of the cassette. The integral cassette grip (5) includes depressions that are conveniently implemented in the injection-molded parts at no cost, and can be conveniently gripped by an operator's fingers and hand. Further, the integral grip is extremely durable and remains operational even if the primary cassette handle (4) is damaged or removed.

Figure 9:
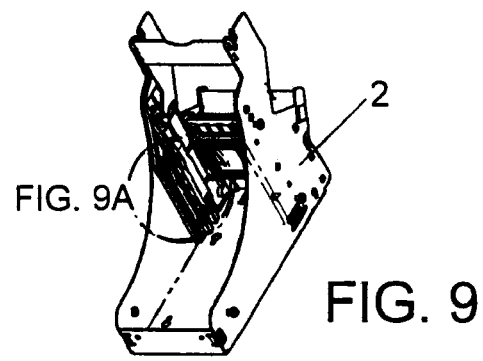
FIG. 9 is a detailed view of chassis showing the cassette installation guide rails and springs.
Figure 9A:
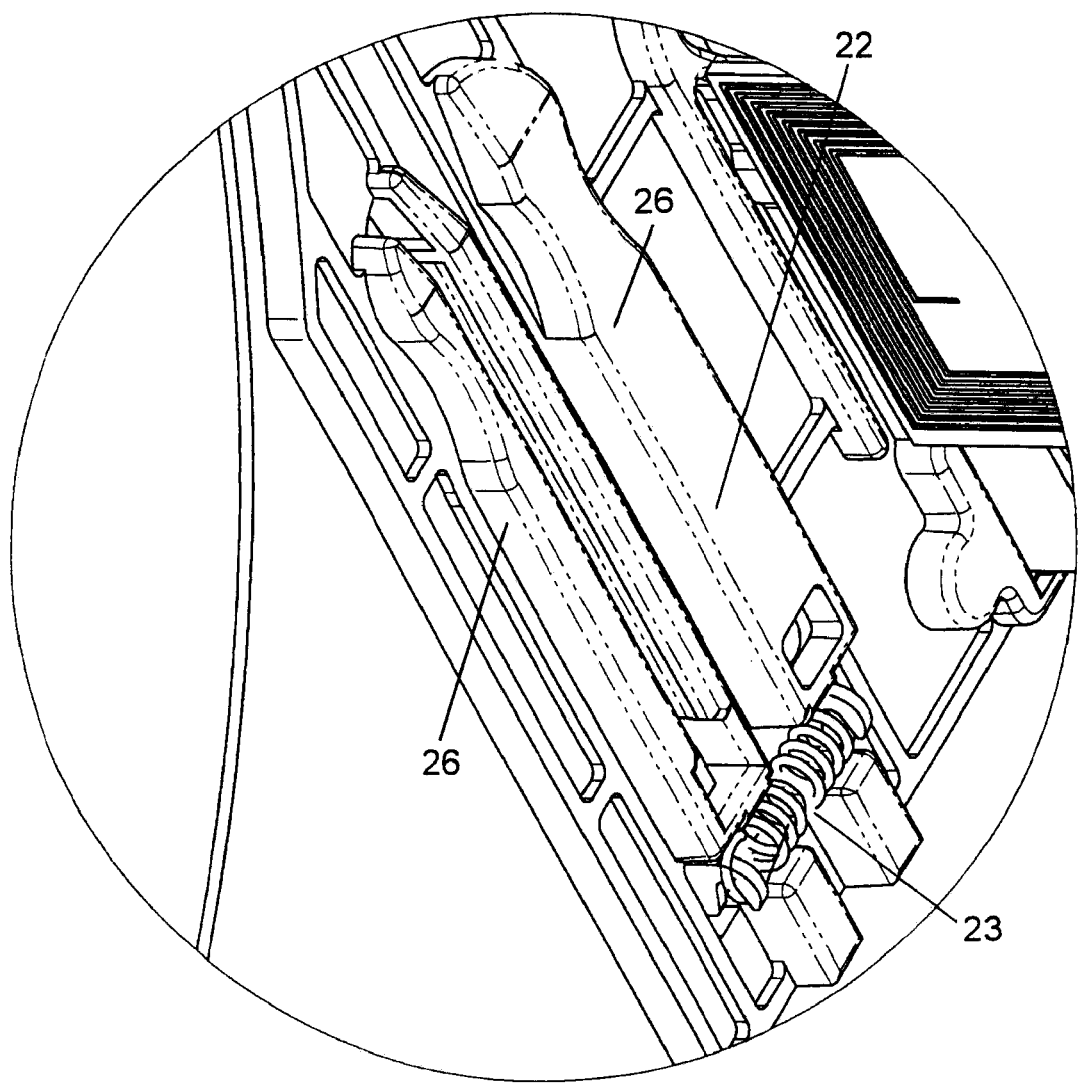
FIG. 9A is a detail view of part of FIG. 9.
Figure 10:
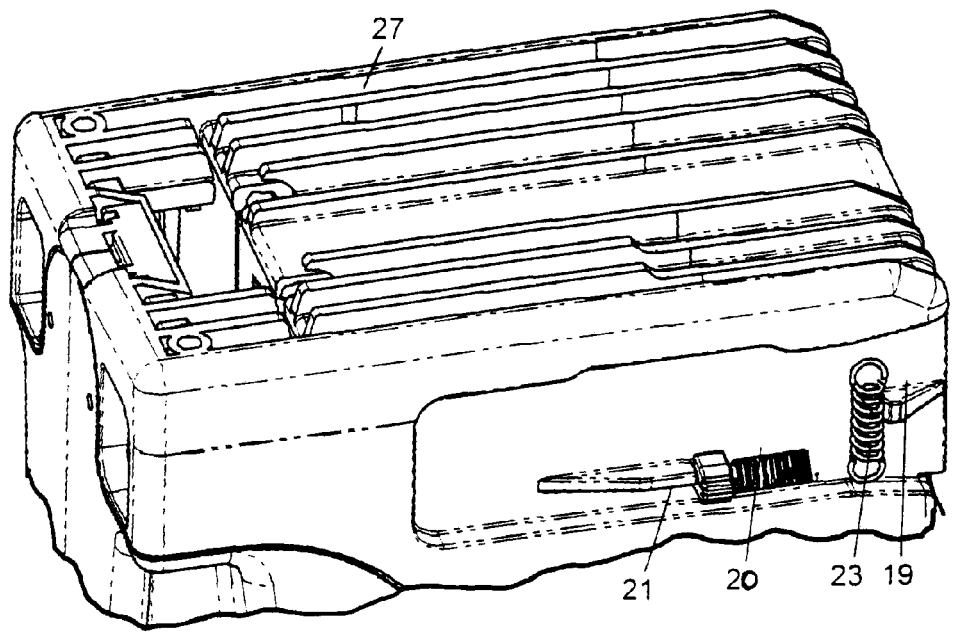
FIG. 10 is a simplified view showing springs for the cassette in the latched position.
Figure 11:
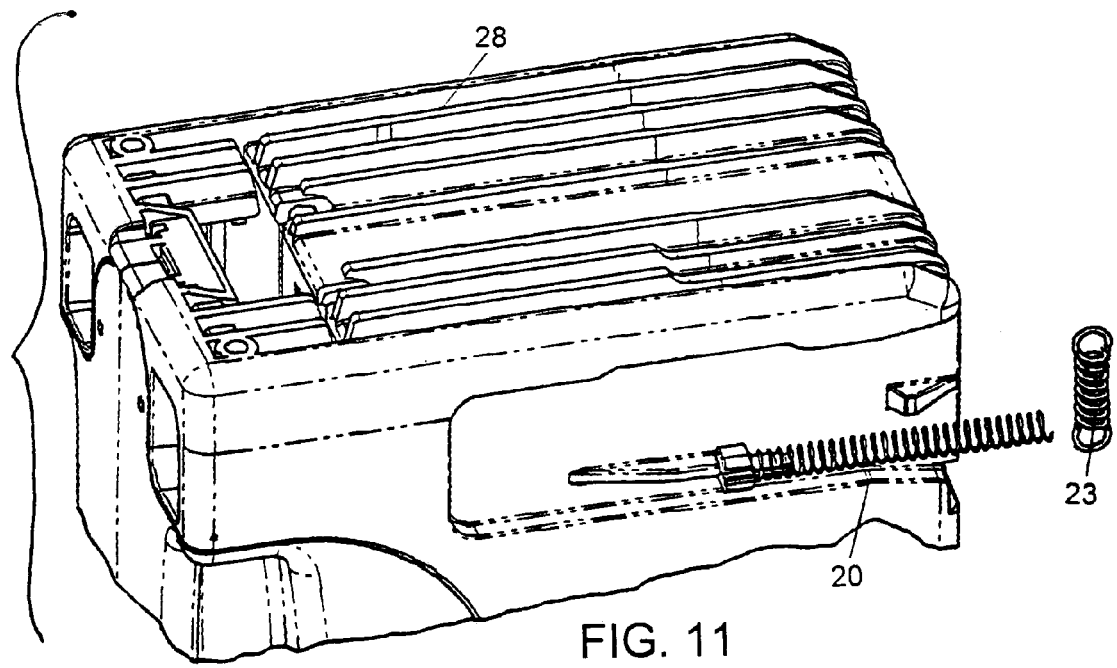
FIG. 11 is a simplified view of the cassette and retention springs in the unlatched position.
Figure 12:
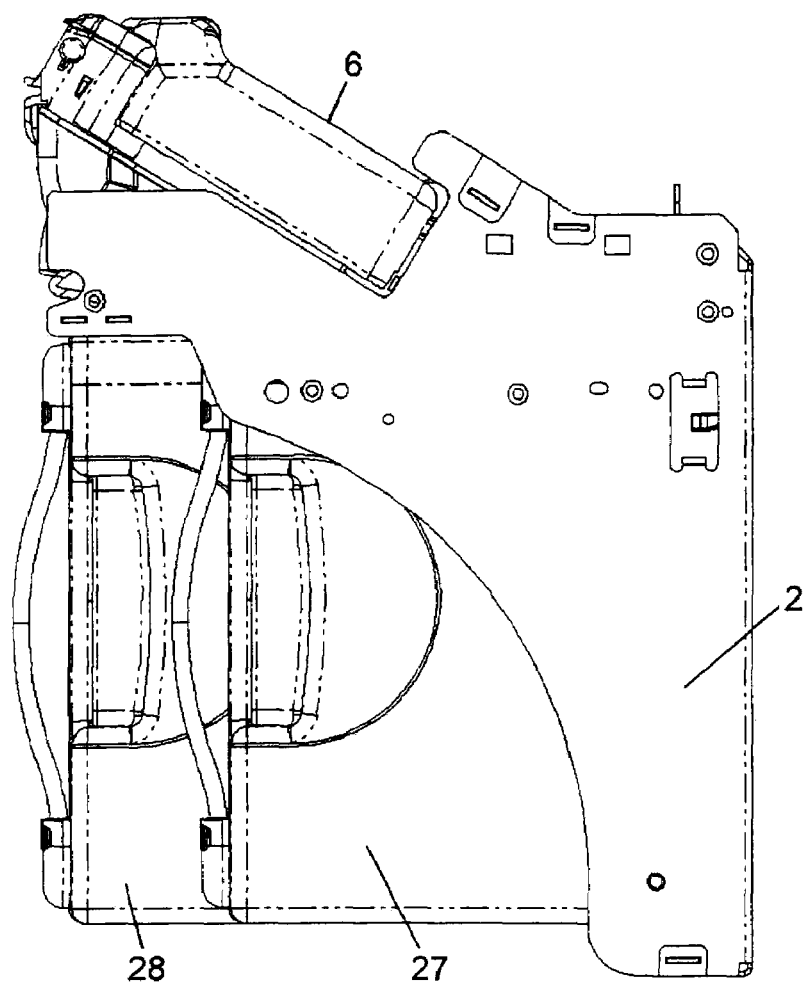
FIG. 12 is a side elevation review of the banknote acceptor showing the cassette in its latched and unlatched locations.

Removal of the secure banknote cassette (3) is achieved by exerting a pull force on the cassette handle (4) or the cassette grip (5) sufficient to overcome a retention force. Referring to FIGS. 8 and 9, the retention force is provided by a cassette latching spring (23) on a latching ramp (19) (see the latch ramp detail in FIG. 8, and the location of cassette ejector springs shown in FIG. 9). Referring to FIGS. 8, 10 and 12, once sufficient force to overcome the retention force has been applied by an operator, the action of an ejector spring (20) on an ejection lug (21) causes the removable secure banknote cassette (3) to move approximately two inches, in this implementation, toward the operator. Thus, FIG. 12 shows the positions of an installed cassette (27) and an ejected cassette (28). Once ejected, the removable secure banknote cassette (3) can then be slid out of the chassis without further resistance. FIG. 10 is a partial cutaway view of an installed cassette with the cassette springs in their latched position, while FIG. 11 illustrates the cassette springs in their unlatched position.

During typical operations, an empty cassette replaces a removed one. Inserting another cassette is also achieved in a simple manner. Referring to FIGS. 9, 10 and 11, the removable secure banknote cassette (3) is first approximately aligned with chassis guide rails (26) and then pushed home with sufficient force and stroke to overcome the resistance of the ejector spring (20) and the spring member (16) on the latching ramp (23).

In the present implementation, if the insertion effort is unsuccessful the ejector (20) will push the removable secure banknote cassette (3) back towards the operator by approximately two inches as shown by the ejected cassette (28) in FIG. 12. This gives a clear visual indication and tactile feedback to the operator that the operation did or did not succeed. Furthermore, in many applications involving various automatic transaction machines it will not be physically possible to close the outside panel access doors of the automatic transaction machine with the removable secure banknote cassette (3) in the ejected position. FIG. 12 illustrates the difference in positions between a latched or installed cassette (27) and an unlatched or ejected cassette (28) in relation to the chassis (2) and bill validator (6).

Figure 3:
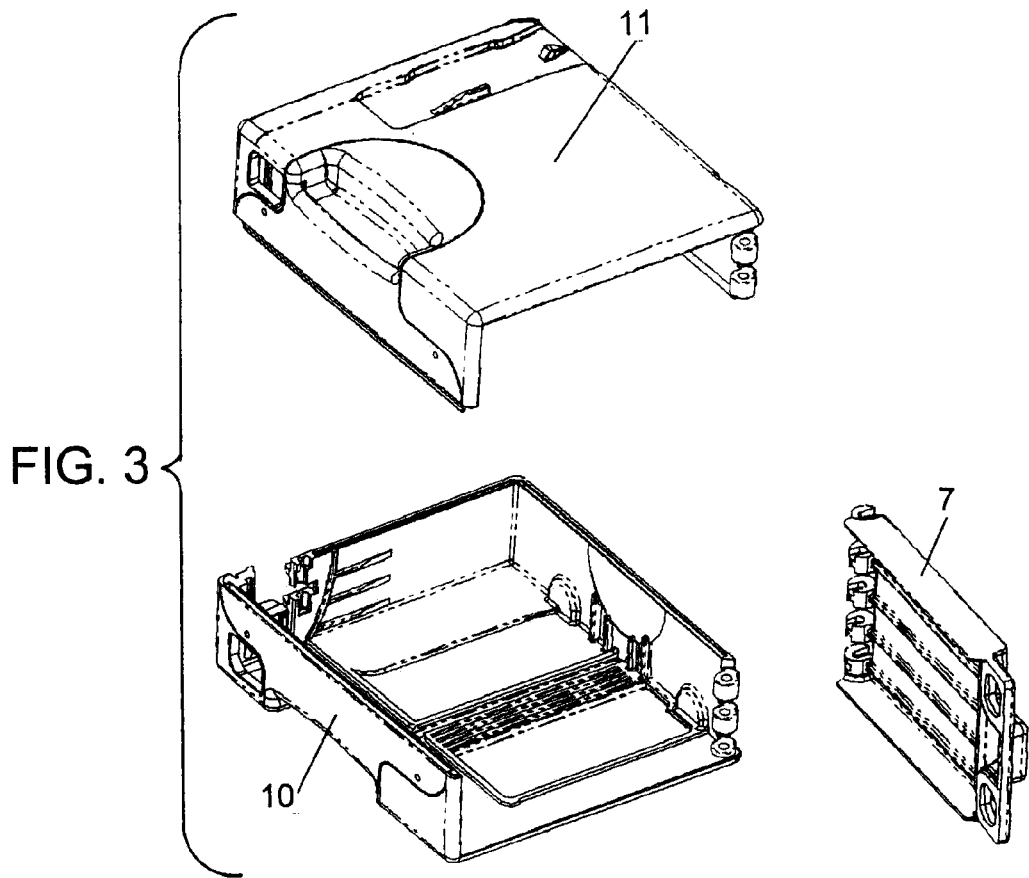
FIG. 3 is an exploded view of the cassette assembly showing how an enclosure according to the invention is formed of two half shells and a secure lockable door.
Figure 5:
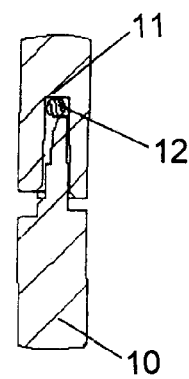
FIG. 5 is a detailed cross section of the welded joint of FIG. 4 just prior to bonding.
Figure 6:
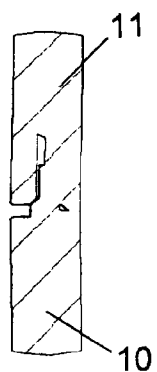
FIG. 6 is a detailed cross section of welded joint after bonding.

The construction of the removable secure banknote cassette (3) is now described in more detail. The cassette (3) may be made from molded plastic and have a single wall construction. FIG. 3 is an exploded view of an implementation of a cassette shell assembly. Referring to FIG. 3, the outer shell includes a cassette left half (10), a cassette right half (11) and a currency access door (7). The two halves of the cassette may be provided with a tongue and groove feature to facilitate assembly alignment and welding. A suitable joining process may utilize a plastic welding process commercially available from EmaBond, a division of the Ashland Chemical Company. A novel aspect lies in the application of this known process to the field of payment systems. A brief summary of the welding process is shown in FIGS. 4 to 6 and is provided here for informational purposes.

In an implementation, the plastic shell halves of the lockable removable cassette (3) may be molded with inserts of reinforcing material. It is also contemplated that the outer shell may be overmolded with a resilient material or a soft material. For example, cassette left half (10) and cassette right half (11) may be fabricated by first inserting steel parts (for strength) into an injection mold tool and then molding plastic against the parts to form the cassette outer shell pieces. In addition, or alternately, a soft resilient material, such as a pliable rubber or the like, could be overmolded around a portion or all of the outer shell to enable the cassette (3) to better absorb impacts. One skilled in the art would recognize that various materials could be used to either impart strength or improve shock absorption, and that such materials may be applied to a portion or to the entire structure of the cassette.

Figure 4:
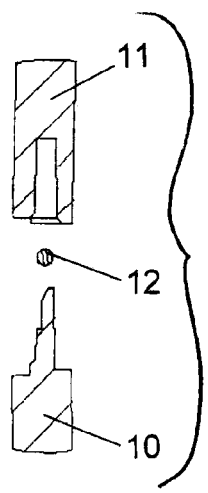
FIG. 4 is a detailed cross section of a welded joint before welding occurs.

FIG. 4 is an exploded view of a portion of the two halves of the cassette to be joined shown positioned prior to assembly. Prior to welding, a weld bead or weld material (12) is inserted and is sandwiched in the joint as shown in FIG. 5. The weld material (12) contains a fusible carrier typically made of the same thermoplastic material as the left half of cassette (10) and the right half of cassette (11). In addition it contains a ferritic heating material in a distributed form. The pre-assembled joint as shown in FIG. 5 is next subjected to an intense radio frequency field. The absorption of this field by the heating agent causes the weld material to fuse and form a thermal weld between the halves. Slight pressure is then applied to fully close the joint until it has cooled into a rigid state as shown in FIG. 6. In this manner a durable single-wall construction of the cassette (3) as shown in FIG. 3 is achieved.

Figure 2:
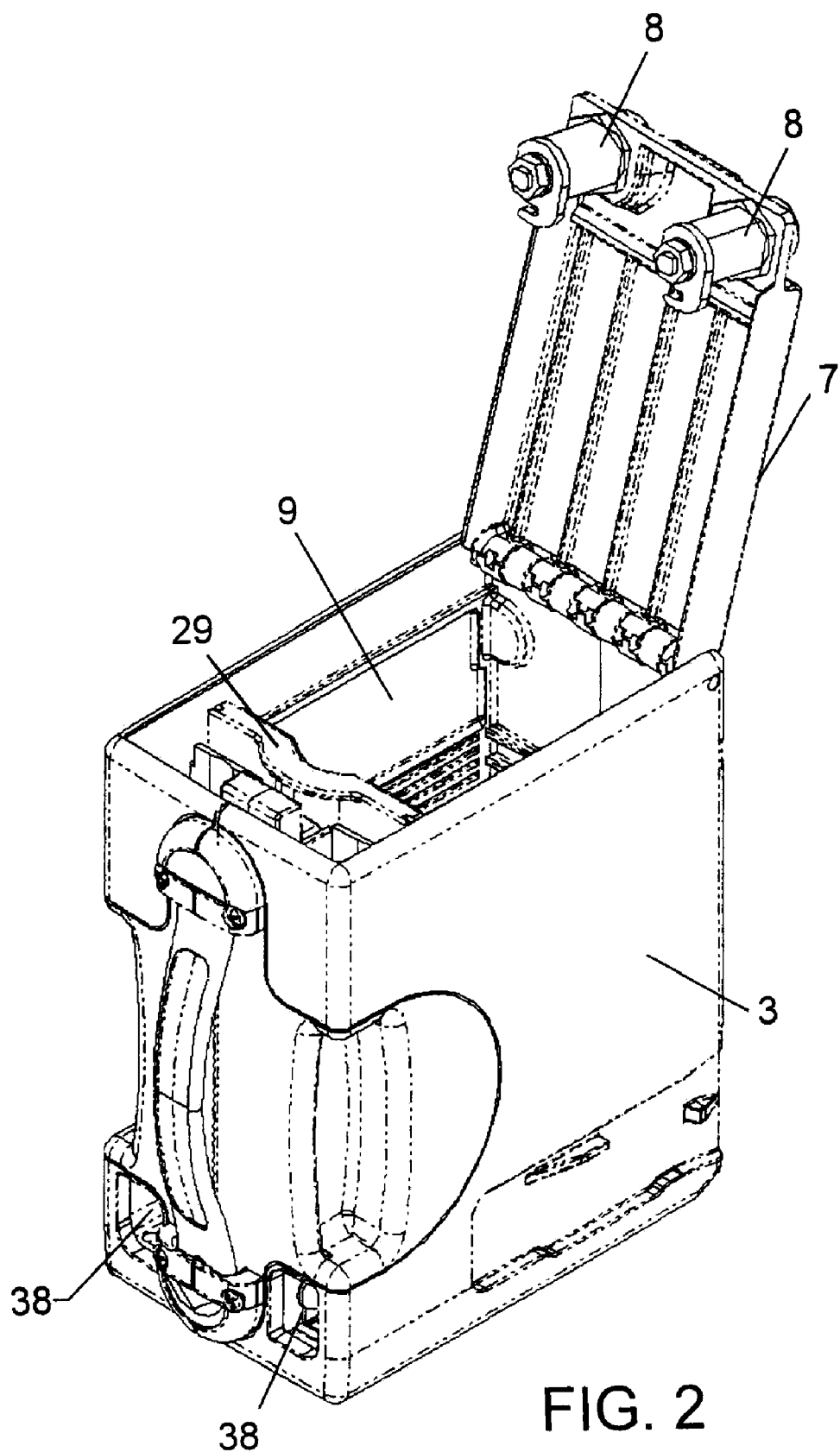
FIG. 2 is an isometric view of the lockable cassette removed from the acceptor showing the cash access door in the open position.
Figure 13:
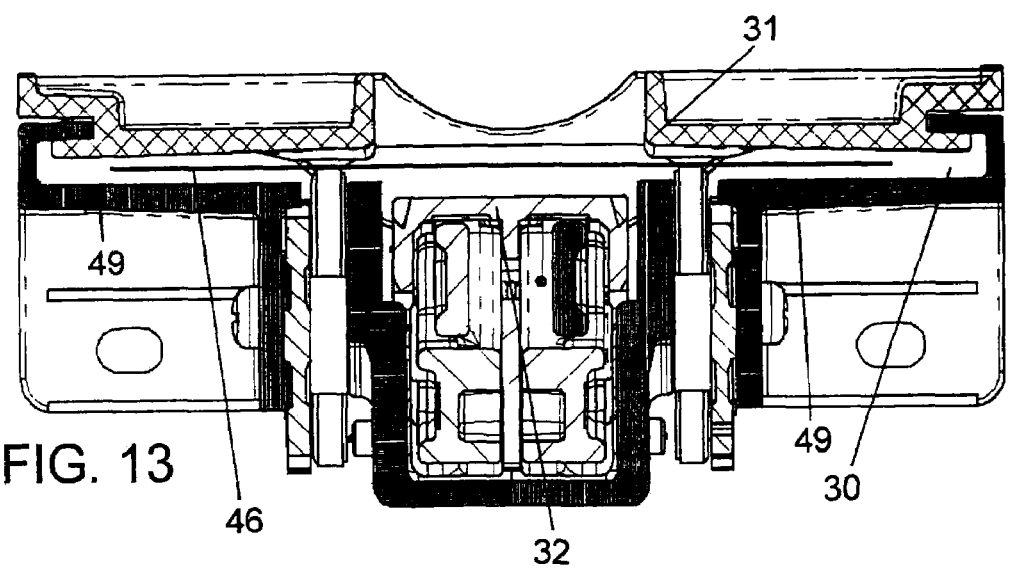
FIG. 13 is a cross section of the banknote path in the stacker mechanism.

FIG. 2 illustrates the various components of an assembled cassette (3) with access door (7) in an open position. In particular, a portion of a stacking mechanism (29) can be seen seated in the cassette adjacent to the banknote compartment (9). The access door (7) includes locking means (8) which conventionally require the use of keys (not shown) to unlock. A pair of viewing windows (38) has been provided in the outer shell of the removable secure banknote cassette (3) in the bottom portion that face an operator when installed. These apertures (38) together with the use of transparent materials for the aperture plate (31) and the banknote channel housing (49) of the stacker mechanism (29)(See FIG. 13, which is a cross-section illustration of the stacker) make it possible to see a portion of the last bill or banknote (46) inserted when the cassette is installed. This provides the operator with two useful advantages: Firstly, the operator can easily determine whether the removable secure banknote cassette (3) contains any documents or if it is empty. Secondly, it is possible to resolve disputes with a customer over the denomination of the last bill (46) inserted without having to remove the cassette (3) from the chassis (2). Both the above functions are useful in situations where access to the keys for opening the locks (8) of the currency access door (7) of the removable secure banknote cassette (3) is tightly controlled.

Figure 16A:
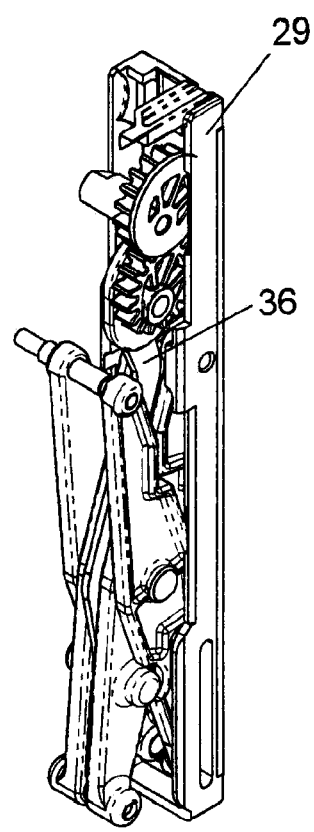
FIGS. 16A and 16B are an isometric view and a detail view, respectively, of the stacker mechanism in the fully retracted position.
Figure 16B:
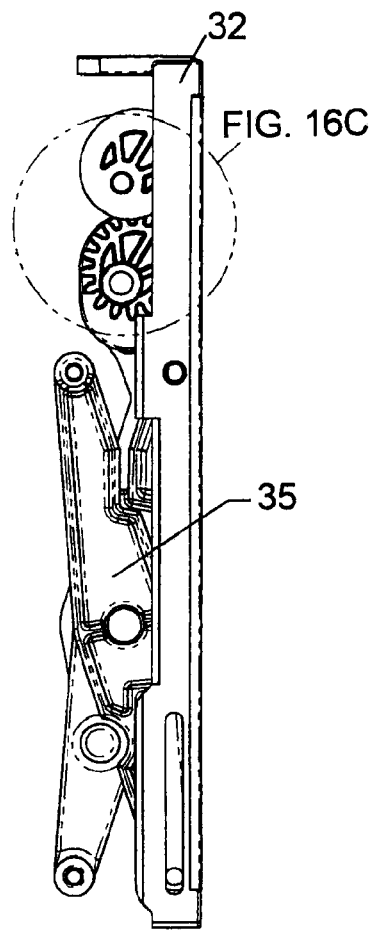
Figure 16C:
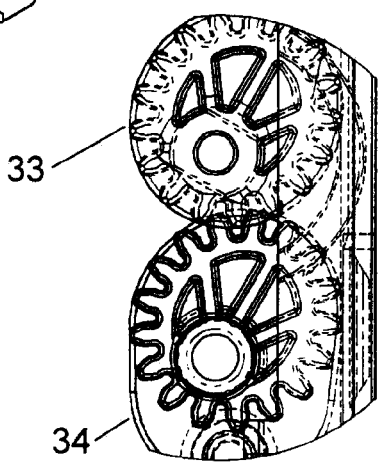
FIG. 16C is a detail view of part of FIG. 16B.
Figure 17:
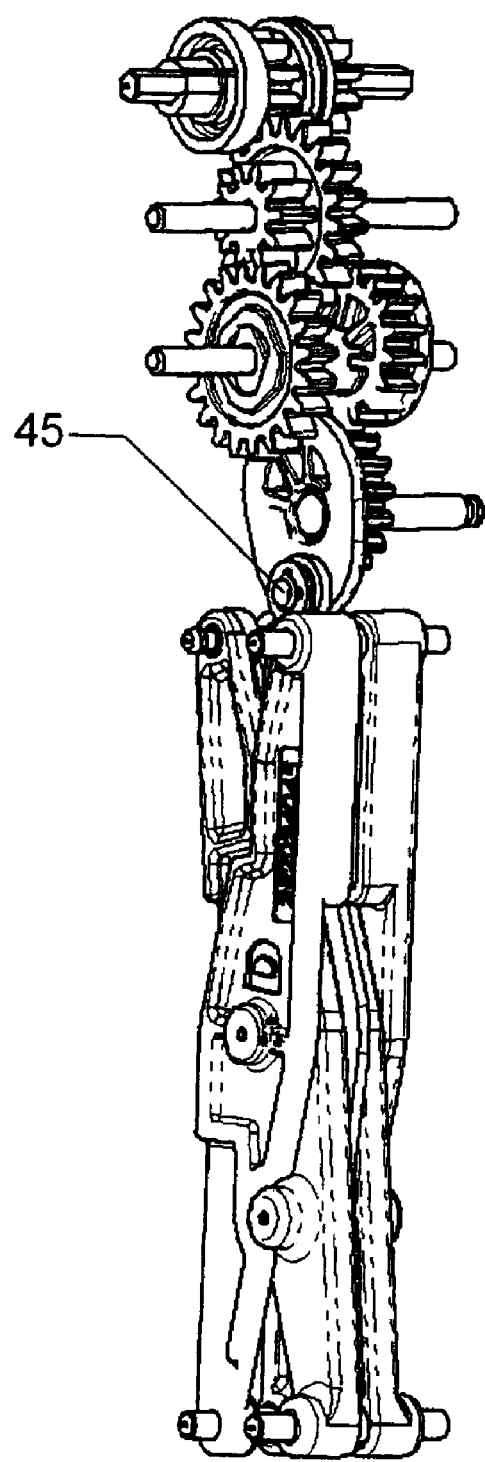
FIG. 17 is an alternative view of the stacker illustrating how the non-circular gears are connected to the scissor mechanism via a crank pin.
Figure 18A:
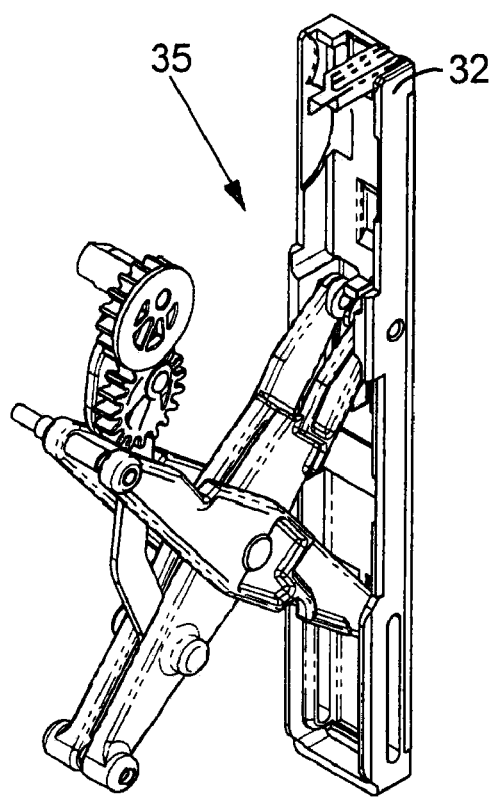
FIGS. 18A and 18B are isometric and detail views of the stacker mechanism in the fully extended position.
Figure 18B:
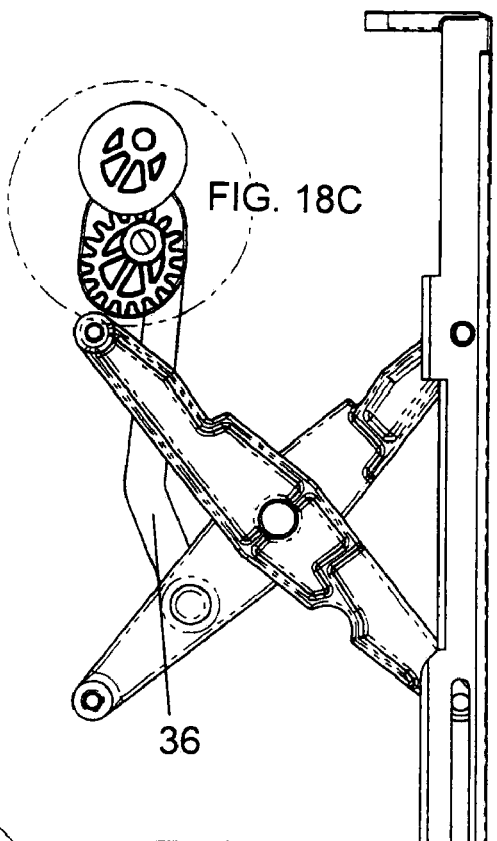
Figure 18C:
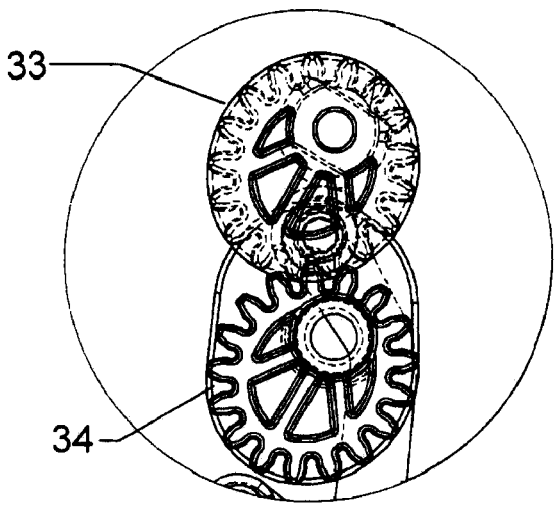
FIG. 18C is a detail view of part of FIG. 18B.

In general, stacking mechanisms that include a banknote pusher plate and scissors arrangement for storing bills in a cash box are well known. However, as shown in FIGS. 16, 17 and 18, the present stacking mechanism (29) activates scissor arms (35) by means of a central link arm (36) attached to a crank pin (45). The essential kinematic elements of this linkage are shown in FIG. 14 and FIG. 15.

Figure 14:
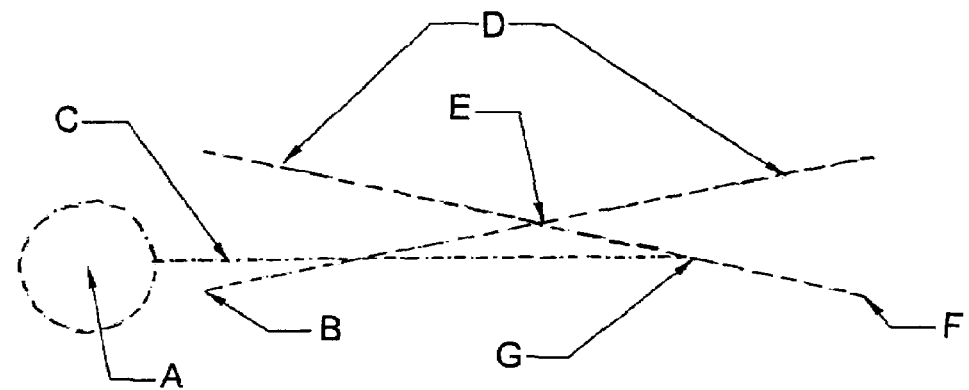
FIG. 14 is a kinematic diagram of the stacker mechanism in the retracted position.
Figure 15:
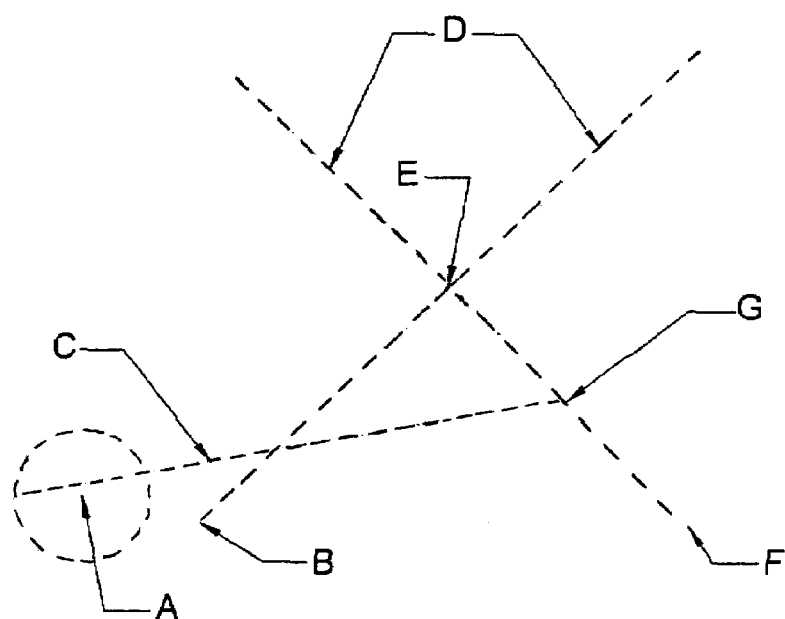
FIG. 15 is a kinematic diagram of the same stacker mechanism of FIG. 14 in the extended position.

Regarding FIGS. 14 and 15, the crankshaft rotates about a fixed center (A). One end of the scissor mechanism is pivotally mounted about the fixed point (B). The other end of the scissors mechanism is connected to the frame at (F) by a pivot point that has freedom to slide in one direction only. A link arm (C) connects the crankshaft to the scissors at a pivot point (G). In prior art systems it is conventional to make points (G) 41 and (F) coincident. The present implementation, however, obtains a maximum scissor stroke within a small height, wherein the height is primarily constrained by the radius of the crank mechanism. In particular, use of an offset between points (G) and (F) permits some amplification of the scissor stroke, such that a reduced thickness or compact stacking mechanism (29) is obtained. Referring to FIG. 15, when the crankshaft rotates to pull link arm (C) to the left in the drawing, the scissor arms are extended such that the angle (D) between scissors is reduced and the crossover point (E) moves toward a banknote compartment to move a pusher plate to store a banknote. The technique of stacking bills using a pusher plate and an aperture plate is well known and will not be discussed in detail herein.

Figure 7:
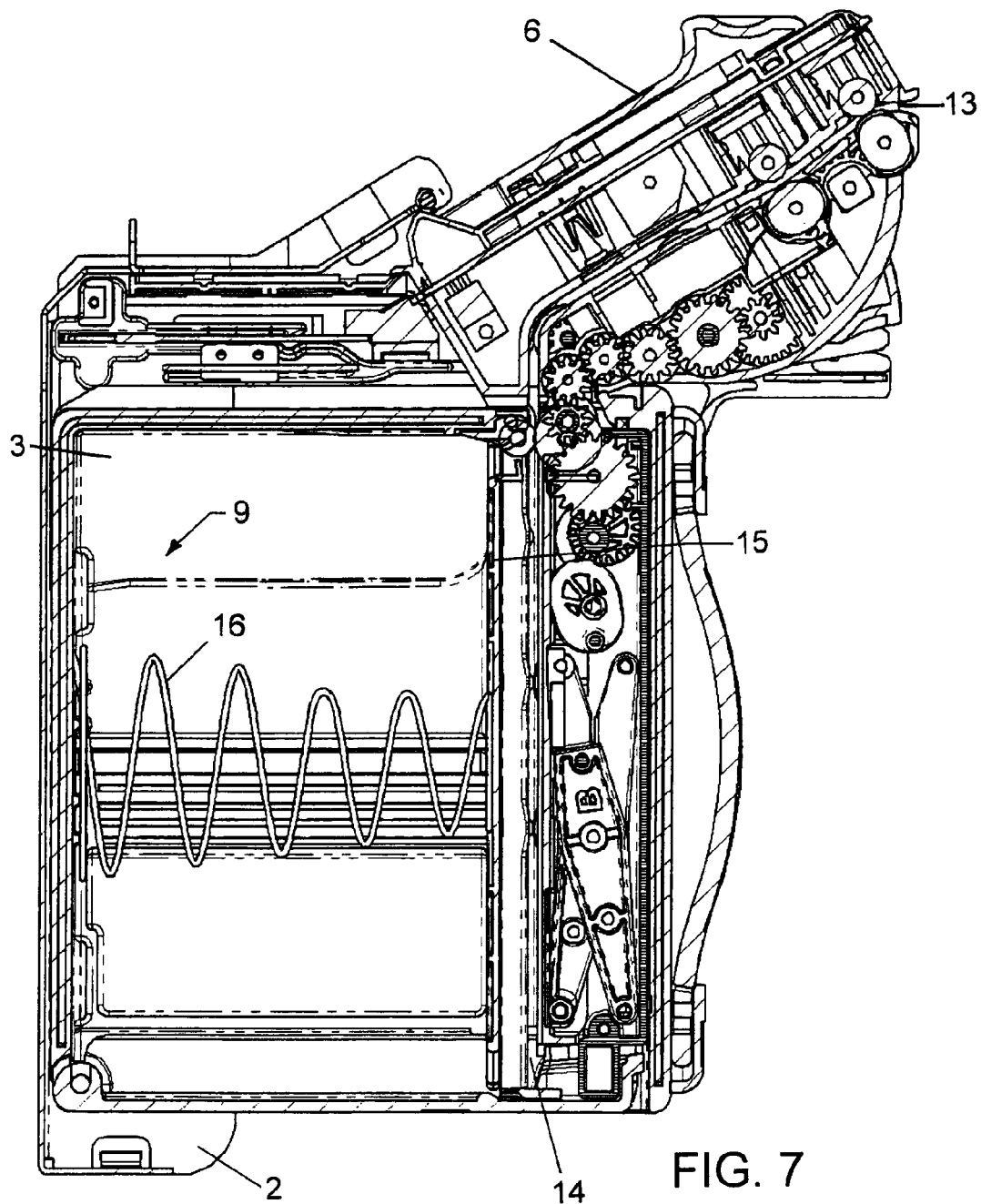
FIG. 7 is a cross-sectional view of the banknote acceptor showing the general arrangement of the bill path.

The simplicity of the compact stacker (29) arrangement (see FIG. 16A) results in a compromise in the mechanical effectiveness of the system. When the mechanism is close to the retracted position as shown in FIGS. 16A and 16B, a very large force must be applied to the central link arm (36) to initiate movement. This force is required, as shown in the cross-sectional view of FIG. 13, to exert pressure via the scissor arms (35) on the banknote pusher plate (32) to strip a banknote (46) from the banknote channel (30) and past the aperture plate (31) into the banknote compartment (9) as shown in FIG. 7. Conversely, it may be seen that a much more advantageous force ratio exists when the stacking mechanism (29) is close to the fully extended position shown in FIGS. 18A and 18B.

If a prime mover is specified of sufficient torque to be adequate at the beginning of the stroke, excessively large forces may be generated at the fully extended position, especially when the removable secure banknote cassette (3) is filled with currency. In order to improve this situation the final gear pair (shown in detail H of FIG. 18) is made from custom parts and includes non-circular drive gear (33) and non-circular driven gear (34). These gears have a profile such that the operating radius varies with angle as the gears rotate. The gears are designed as a complementary pair so the combined operating radii add up to a constant value for any given input angle. The gear profiles are chosen so that the maximum reduction ratio is achieved at the point of highest torque demand. Correspondingly, the maximum increase of ratio occurs close to the fully extended position as shown in FIGS. 18A and 18B where excessive thrust could be a problem. In this instance the profiles are chosen so the gears are capable of continuous rotation. Other gear profiles may be employed if the input drive to the mechanism is reversed as part of the complete cycle.

Current banknote acceptors use belts to transport the banknotes within a stacking mechanism. An alternative arrangement uses a system of drive wheels that may be conveniently connected by simple spur gears.

Figure 19:
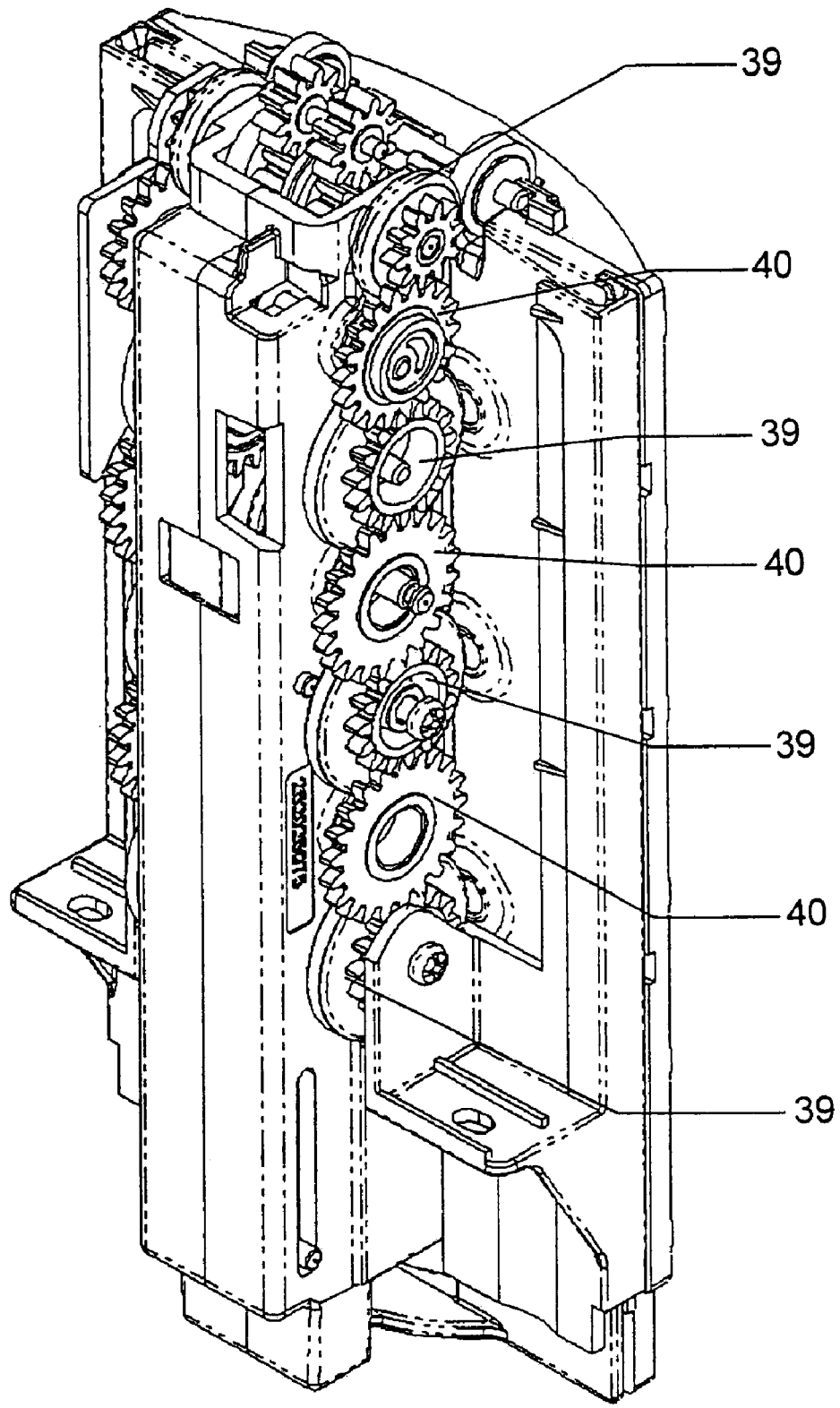
FIG. 19 is a partial cross section of the stacking unit in isometric view wherein transport rollers and associated drive gears are visible.

FIG. 19 illustrates a partial section of a stacker mechanism. Drive wheel assemblies (39) alternate with intermediate drive gears (40) to form a beltless drive system. Referring to FIGS. 7 and 19, banknotes are transported from the banknote validator (6) in a generally downwards direction to the stacker (29) wherein the banknote is gripped by the drive wheel assemblies (39). Because less material deflection is required in this beltless drive system compared with a belt transport, the mechanical efficiency and durability are also improved. The problem of belt tracking where small shaft miss-alignments cause a belt to wander off its guide pulleys is eliminated as well.

Figure 20:
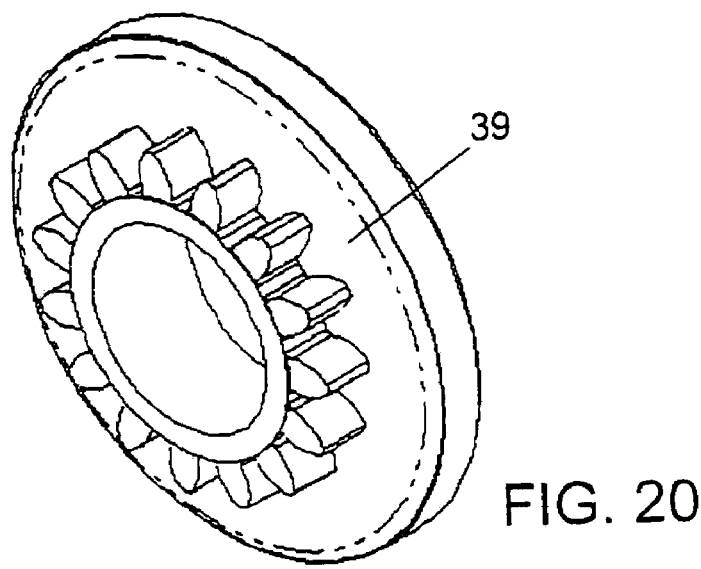
FIG. 20 is a form of a drive wheel that combines gear teeth with an integral molded tire.
Figure 21:
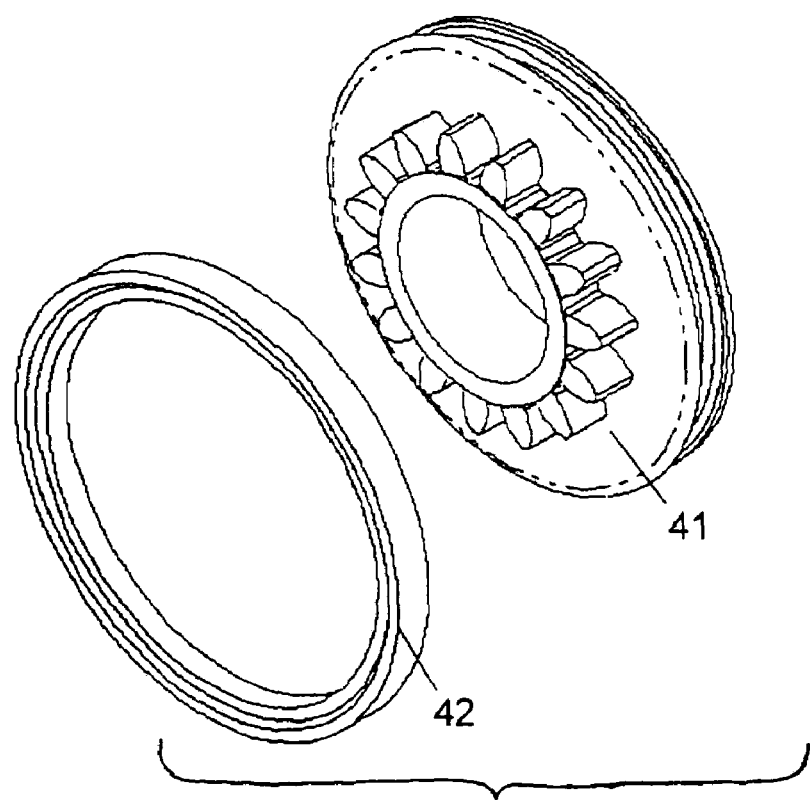
FIG. 21 illustrates the form of the constituent components of the drive wheel assembly of FIG. 20, wherein the tire is formed over the gear hub and is not assembled to it.

FIGS. 20 and 21 illustrate a gear and tire assembly and an exploded view of the gear and tire assembly, respectively. In order to minimize manufacturing cost, the flexible tire material is molded around the gear and hub which is in turn an injection molding using a relatively rigid plastic resin such as Acetal or Nylon. The advantages of this arrangement are that the assembly of the tire to the wheel is eliminated and the geometry of the components may easily include features to prevent slipping or detachment of the tire.

FIG. 19 is a partial section of the stacker and is a cut-away view showing how a spur gear train links a series of drive rollers. FIG. 20 shows the finished form of the driving wheels. FIG. 21 shows the form of the base injection molded gear and hub and the shape of the 'second shot' tire component formed around it. The transport tire and gear are therefore combined in a "two-shot" molding process. The "two-shot" molding process is known, and is described, for example, in Volume 63, Number 10A of "Modern Plastics Encyclopedia", pages 252-265 and 340-346 (October 1986).

The currency access door (7) shown in FIG. 3 is assembled to the cassette by aligning it with the welded assembly and inserting a press fit hinge pin (not shown). A level of security is provided by ensuring that the press fit hinge pin is pressed into a closed ended pocket and the outer surface is sub-flush making covert tampering difficult.

Figure 22:
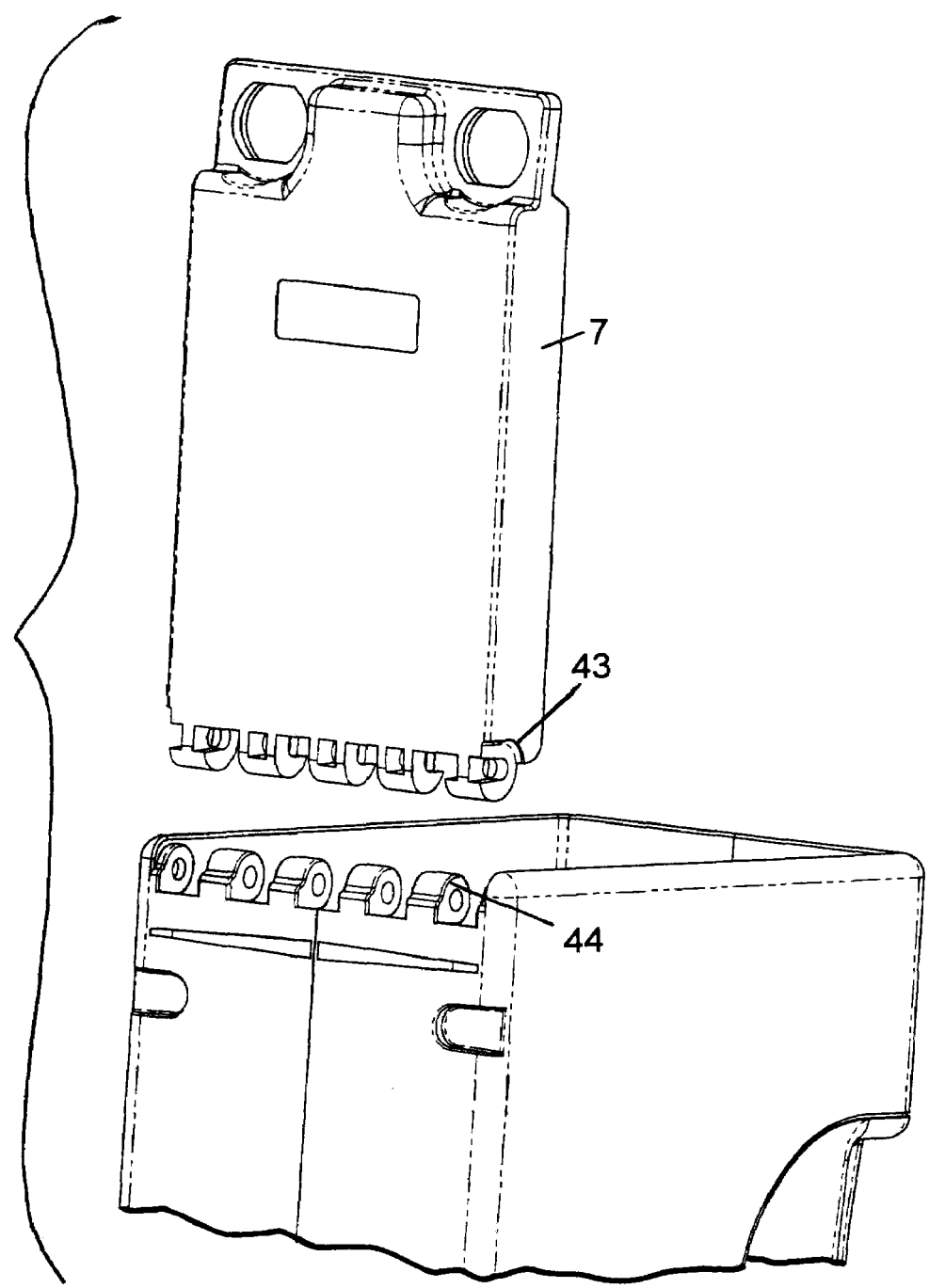
FIG. 22 is a detail view of a hinge design for the cassette.
Figure 23A:
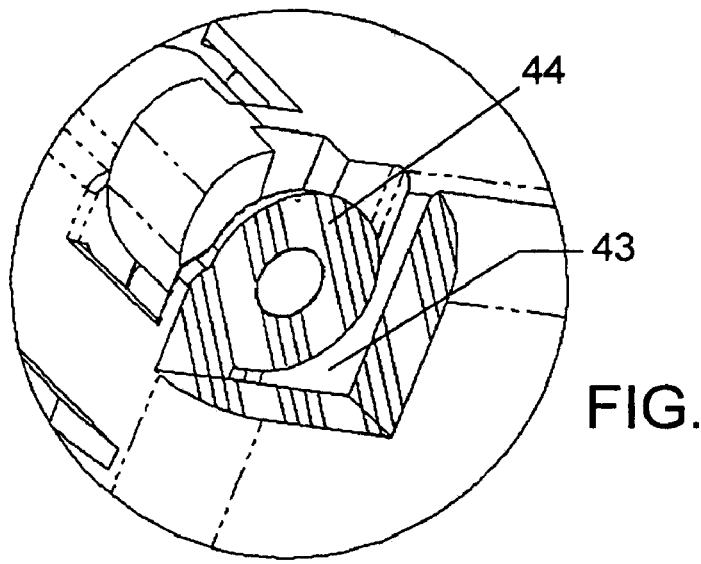
FIG. 23A is a detail view of part of FIG. 23.
Figure 23:
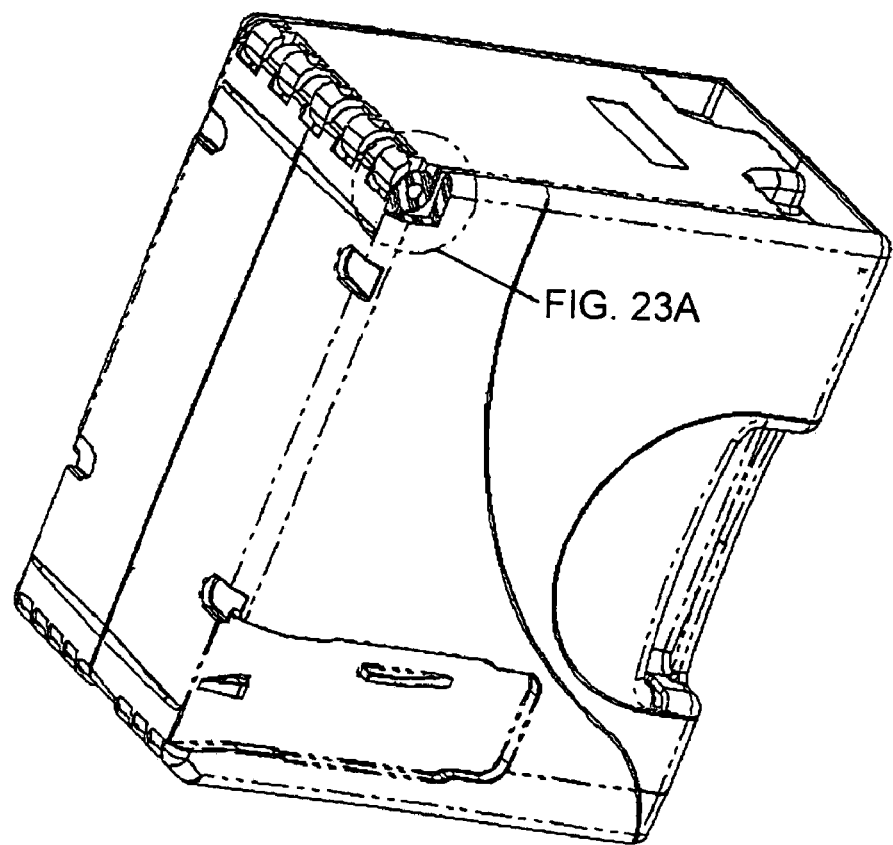
FIG. 23 shows a cut-away section of the cassette hinge illustrating how the door interlocks with the cassette shell.

Referring to FIG. 22, the design of the currency access door (7) also incorporates a novel feature that prevents opening of the door even when the hinge pin is completely removed. It can be seen in FIG. 22 that the form of the door contains a locking rib (43). This feature is duplicated on the opposite (hidden in FIG. 22) side of the door as well. The shape of this locking rib (43) engages with a hinge boss (44) in such a manner that the door cannot be removed from the body of the cassette unless it is first rotated through approximately 90 degrees. FIG. 23 is a cut-away section showing how items (43) and (44) interlock. In normal operation of the cassette the access locks (8) shown in FIG. 2 prevent door rotation when they are in the locked position.

Figure 24A:
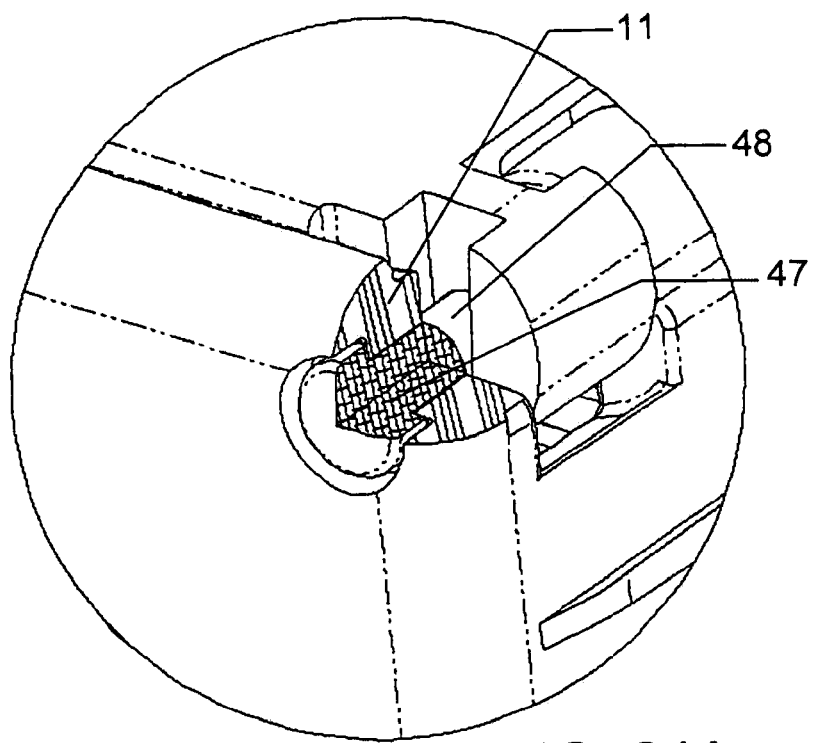
FIG. 24A is a detail view of part of FIG. 24.
Figure 24:
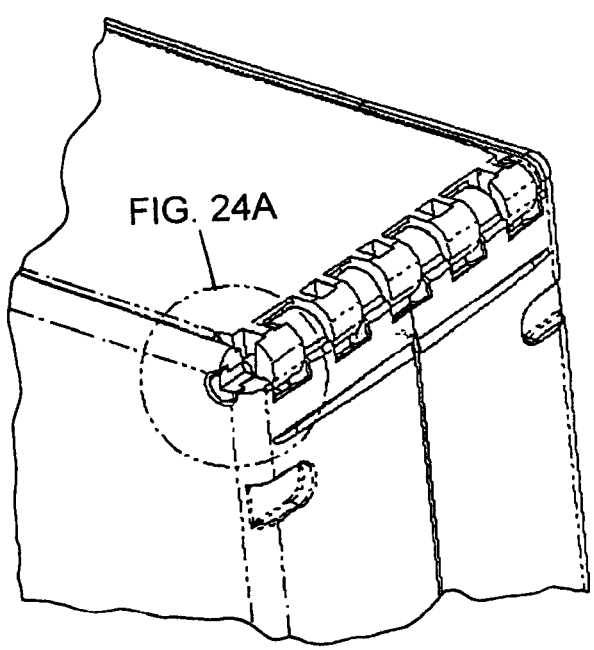
FIG. 24 illustrates an alternative method of securing the hinge using orbital riveting.

In an alternative embodiment a pair of hinge pins are used. One pin is inserted from each side of the cassette. In another alternative implementation shown in FIG. 24, the hinge pin may have one or both ends formed by orbital riveting. For example, a pin (48) with one end preformed is inserted into the hinge assembly and then a head is formed by permanent deformation of the material by, for example, orbital riveting. The result in each case is that the door remains secure even when the hinge pin(s) is (are) removed.

Figure 25:
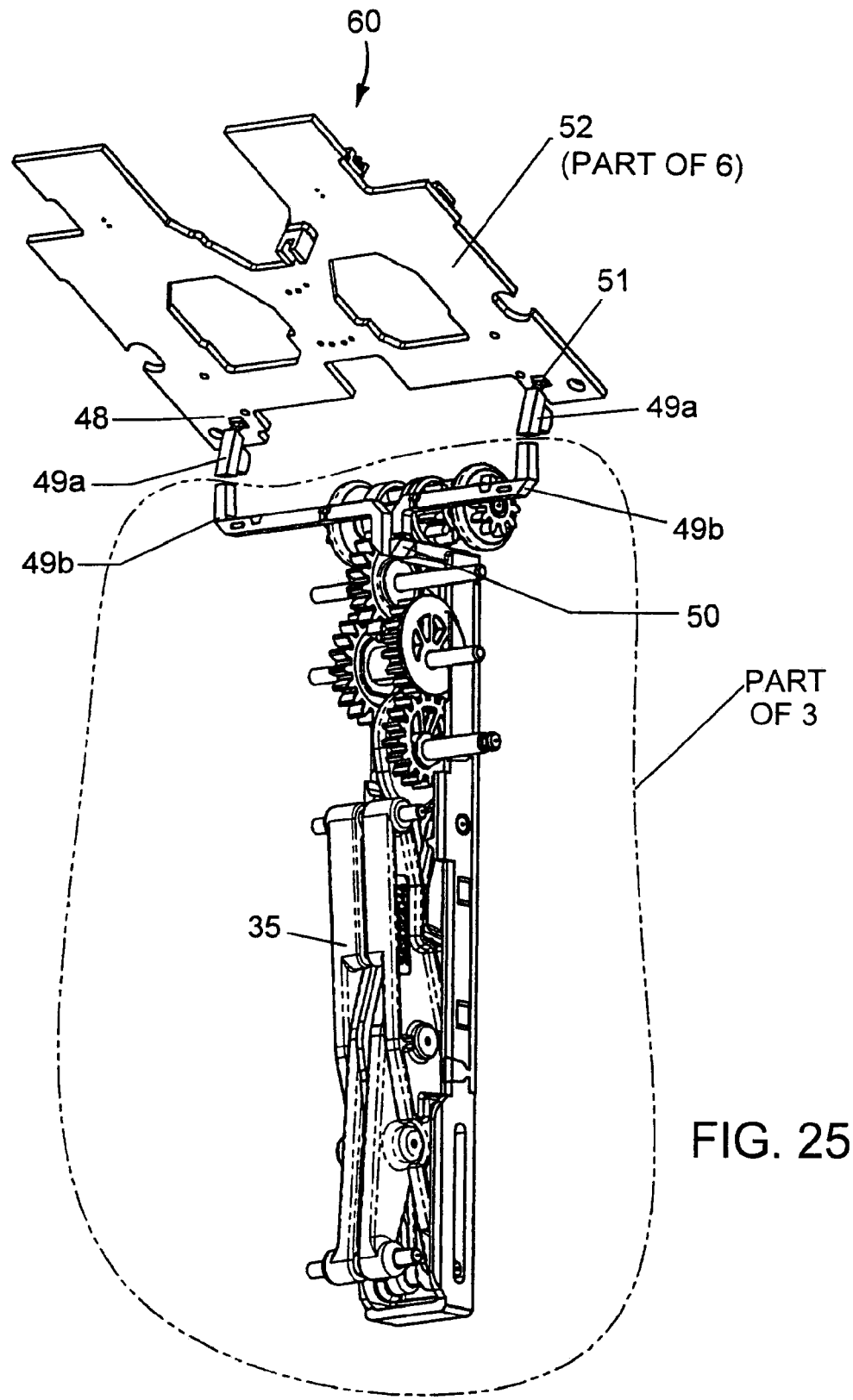
FIG. 25 illustrates an implementation of a combined cassette and stacker home sensor configuration.

FIG. 25 illustrates an implementation of a combined cassette and stacker home sensor configuration (60). This implementation combines the functions of a stacker home sensor and a cassette present sensor in one system, and such a configuration saves costs. An optical sensing arrangement is shown which improves reliability by eliminating electrical connections.

Referring to FIG. 25, a light source (48) is mounted on a printed circuit board (PCB) (52) which is part of a removable banknote validator (6) (see FIG. 7). The light beam is directed along a series of light pipe moldings (49a and 49b). The upper pair (49a) of these moldings are mounted in the removable banknote validator (6). The lower pair (49b) are mounted in the removable secure banknote cassette (3) (see FIG. 7). The light path from light source (48) to light receiver (51) is completed by a prism (50) which may be mounted on the movable banknote pusher plate (32). In such a configuration, the light receiver (51) only receives a signal when the removable secure banknote cassette (3) is present and the banknote pusher plate (32) is at the rest or "home" position which is shown in FIG. 25 and in FIGS. 16a and 16b.

During normal operation a control system sends a signal to drive the stacking mechanism as discussed above with regard to FIGS. 16, 17 and 18. As the scissor arms (35) of the stacking mechanism extend from the home position, the signal output from the light receiver (51) rapidly falls to zero. When the stacker mechanism has completed one full cycle the movable banknote pusher plate (32) returns to its original or home position (shown in FIGS. 16a and 16b) and a positive signal is again seen at the light receiver (51). Upon sensing this signal the control system stops the stacker motor and the unit awaits the next document. Should the light receiver (51) not see a signal within a specified time window after starting the stacking operation, the control system will stop the stacker motor and send a "Cassette Full" message to the host machine.

If the signal level from light receiver (51) falls to a low level without a command to drive the stacking mechanism the control system will assume that the removable secure banknote cassette (3) has been removed and a message to this effect is sent to the host machine. When the same (or another) removable secure banknote cassette (3) is re-installed in the chassis (2) the signal is restored to the light receiver (51) and the banknote processor (1) returns to normal service.

The control system may perform an additional check to verify that a legitimate removable secure banknote cassette (3) has been installed by performing a test run of the stacker mechanism. If the signal from the light receiver (51) shows the characteristic sequential signal transitions representative of a full stacking sequence or cycle, then a genuine removable secure banknote cassette (3) is deemed to be present.

A number of embodiments of the present invention have been described. Nevertheless, it should be understood that various modifications might be made without departing from the spirit and scope of the invention. Accordingly other embodiments are within the scope of the following claims.

What is claimed is:

1. A document processing system comprising:
   a lockable, removable cassette for storing documents;
   a document stacker; and
   a sensor to detect installation of the lockable, removable cassette and a home position of the document stacker, wherein the sensor includes a light source, a light path and a light receiver, wherein the light path comprises a series of light pipes and a prism in addition to the light pipes.

2. The system of claim 1 comprising a banknote validator, wherein a first pair of the light pipes is mounted in the banknote validator and a second pair of the light pipes is mounted in the removable cassette.

3. The system of claim 2 wherein the sensor is arranged such that the light receiver receives a signal from the light source only if the removable cassette is installed and the document stacker is in its home position.

4. The system of claim 2 wherein the light path comprises an input port, an interrupt portion and an output port.

5. The system of claim 4 wherein the document stacker comprises a pusher plate, and wherein the interrupt portion is connected to the pusher plate.

6. The system of claim 5 wherein the light path comprises a prism mounted on the pusher plate.

7. A lockable cassette for storing documents comprising a document stacker and an internal mechanism that is at least partially transparent, wherein the internal mechanism comprises a sensor that includes a light piping path including a series of light pipes, the document stacker comprises a pusher plate, and a transparent part of the internal mechanism is mounted on the pusher plate.

8. The cassette of claim 7 wherein a transparent part of the internal mechanism comprises a prism in the light piping path.

9. An apparatus comprising a lockable, removable cassette for a banknote processor, the cassette comprising an aperture or a transparent window and an internal mechanism that is at least partially transparent to allow visual observation of a document stored in the cassette, wherein the cassette includes a document stacker having a pusher plate, wherein the at least partially transparent internal mechanism is mounted on the pusher plate.

10. The apparatus of claim 9 wherein the at least partially transparent internal mechanism comprises an aperture plate of the document stacker.

11. The apparatus of claim 9 wherein the at least partially transparent internal mechanism comprises a banknote channel housing of the document stacker.

12. An apparatus comprising a document storage cassette for a banknote processor, the cassette comprising a transparent window and a document storage area,
   wherein the cassette contains a stacker mechanism adjacent the document storage area, the stacker mechanism comprising a channel housing and an aperture plate that define a channel to receive a document, the stacker mechanism further comprising a pusher plate to push the document from the channel past the aperture plate and into the document storage area,
   wherein the channel housing and the aperture plate are transparent to allow visual observation, via the transparent window, of a document stored in the document storage area of the cassette.

13. The apparatus of claim 12 wherein the channel housing and the aperture plate are transparent to allow visual observation, via the transparent window, of a most recent document stored in the document storage area of the cassette even when multiple documents are stored in the cassette.

14. The apparatus of claim 12 wherein the cassette comprises a pair of transparent windows on a side of the cassette that is parallel to the stacker mechanism and perpendicular to a direction of movement of the pusher plate, wherein a document stored in the banknote storage area of the cassette is visible through either one of the transparent windows.

15. The apparatus of claim 12 wherein the transparent window is disposed in a side of the cassette, and wherein the stacker mechanism is disposed between the side of the cassette with the transparent window and the document storage area.

16. An apparatus comprising a document storage cassette for a banknote processor, the cassette comprising a transparent window and a document storage area,
   wherein the cassette contains a stacker mechanism adjacent the document storage area, and wherein portions of the stacker mechanism define a channel to receive a document, the stacker mechanism further comprising a pusher plate to push the document from the channel into the document storage area, and
   wherein at least some of the portions of the stacker mechanism defining the channel are transparent to allow visual observation, via the transparent window, of a document stored in the document storage area of the cassette.

* * * * *